(12) United States Patent
Vandeginste

(10) Patent No.: US 7,119,852 B1
(45) Date of Patent: Oct. 10, 2006

(54) APPARATUS FOR PROCESSING SIGNALS

(75) Inventor: Gudrun Vandeginste, Bruges (BE)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

(21) Appl. No.: 09/543,016

(22) Filed: Apr. 4, 2000

(30) Foreign Application Priority Data

Apr. 6, 1999 (EP) .................................. 99201038

(51) Int. Cl.
*H04N 5/45* (2006.01)
(52) U.S. Cl. ...................................................... 348/602
(58) Field of Classification Search ................ 348/602, 348/603, 604, 606, 571, 627, 678, 563, 569, 348/687; 345/690
See application file for complete search history.

(56) References Cited

U.S. PATENT DOCUMENTS

| | | | | |
|---|---|---|---|---|
| 4,214,273 A * | 7/1980 | Brown | ...................... | 345/440.2 |
| 4,410,841 A * | 10/1983 | Dusard et al. | ............... | 315/382 |
| 5,045,926 A | 9/1991 | Amano et al. | ............... | 348/627 |
| 5,146,316 A * | 9/1992 | Suzuki | ...................... | 348/227.1 |
| 5,237,417 A * | 8/1993 | Hayashi et al. | ............. | 348/569 |
| 5,270,818 A * | 12/1993 | Ottenstein | ..................... | 315/10 |
| 5,486,843 A * | 1/1996 | Otting et al. | .................. | 345/35 |
| 5,488,434 A * | 1/1996 | Jung | ........................... | 348/725 |
| 5,831,686 A * | 11/1998 | Beretta | ........................ | 250/205 |
| 5,933,130 A * | 8/1999 | Wagner | ....................... | 345/690 |
| 5,995,162 A * | 11/1999 | Fujimori | ...................... | 348/569 |
| 6,002,386 A * | 12/1999 | Gu | ............................... | 345/690 |
| 6,064,372 A * | 5/2000 | Kahkoska | ..................... | 345/173 |
| 6,211,922 B1 * | 4/2001 | Jun | ............................. | 345/902 |
| 6,229,577 B1 * | 5/2001 | Barth et al. | ............... | 348/227.1 |
| 6,281,895 B1 * | 8/2001 | Jeong | .......................... | 345/810 |
| 6,292,228 B1 * | 9/2001 | Cho | ............................ | 348/603 |
| 6,337,718 B1 * | 1/2002 | Kim | ............................. | 348/569 |
| 6,342,927 B1 * | 1/2002 | Kimoto et al. | .............. | 348/569 |
| 6,373,531 B1 * | 4/2002 | Hidaka et al. | .............. | 348/602 |
| 6,411,306 B1 * | 6/2002 | Miller et al. | ................. | 345/102 |

FOREIGN PATENT DOCUMENTS

EP 0818923 A2 1/1998
JP 62299948 6/1986

* cited by examiner

*Primary Examiner*—Paulos M. Natnael

(57) ABSTRACT

The invention relates to an apparatus for processing signals, comprising parameter control means for controlling parameters of said signals in response to manual adjustments by the user as well as automatically generated adjustments based on current ambient factors or properties of said signals. The apparatus according to the invention comprises indicator means for presenting a level indicator which is indicative of the combined result of the manual and automatic adjustments.

16 Claims, 2 Drawing Sheets

APPARATUS FOR PROCESSING SIGNALS

FIELD OF THE INVENTION

The invention relates to an apparatus for processing signals, comprising parameter control means for controlling parameters of said signals, said parameter control means being adapted to cause adjustments to said parameters in response to current ambient factors or properties of said signals.

The invention further relates to a method for processing signals, comprising a step of controlling parameters of said signals by determining adjustments in response to current ambient factors or properties of said signals.

BACKGROUND OF THE INVENTION

An apparatus of the above type is known from U.S. Pat. No. 5,045,926. The known apparatus is a display apparatus or television receiver which comprises means for automatically adjusting picture parameters, such as sharpness and luminance level, in response to variations of signal properties, such as signal strength and picture content. For example, the known apparatus raises the picture sharpness in the case of a light image, while the sharpness is lowered in the case of either a dark image or an image received with a small electric field strength, since the preshoot and overshoot of the video signal for raising the sharpness of the image emphasize the noise. As another example, the luminance is lowered in the case of a light image and raised in the case of a dark image, thereby preventing 'black deformation' or 'black separation' regardless of the video content of each image.

OBJECT AND SUMMARY OF THE INVENTION

It is an object of the invention to provide an improved apparatus of the type defined in the opening paragraph. To that end, the apparatus according to the invention further comprises indicator means for presenting a level indicator which is indicative of said adjustments. In this way it is achieved that the continuously varying adjustments of the parameter control means are visualized, giving a viewer an impression of the automatic signal control features of the apparatus and their proper functioning. The indicator means allow a user to compare the operation of the parameter control means with e.g. the signal strength, or the ambient factors as perceived by the user. For example, the apparatus may comprise sensor means for measuring ambient factors, such as ambient light or ambient noise. By alternately changing the ambient factors, or covering and uncovering the sensor means, the operation of the parameter control means can be influenced, which can be examined by means of the parameter control means. In such a way the automatic control features can be demonstrated easily.

A further embodiment of the apparatus according to the invention comprises user control means for setting a preferred parameter level to be input into said parameter control means, said parameter control means being adapted to compute said adjustments as a function of said preferred parameter level and said current ambient factors or properties of said signals. For example, the user control means allow a user to enter a preferred contrast or brightness level. This preferred level is then input into the parameter control means and combined with the measurements representing the ambient factors or signal properties. The resultant parameter adjustments are applied to the relevant signal parameters, and conveyed to the user by means of the indicator means. In this way it is achieved that the user can examine the interaction between the manual settings of the user control means and the automatic adjustments by the parameter control means.

The invention is particularly suitable for controlling picture parameters in monitors and television receivers. Alternatively, the invention can be applied for controlling audio parameters in (car) audio equipment, or any other signal processing apparatus which comprises means for automatically adjusting signal parameters.

BRIEF DESCRIPTION OF THE DRAWINGS

These and other aspects of the invention are apparent from and will be elucidated, by way of a non-limitative example, with reference to the embodiment(s) described hereinafter. In the drawings.

DESCRIPTION OF EMBODIMENTS

Figure 1:
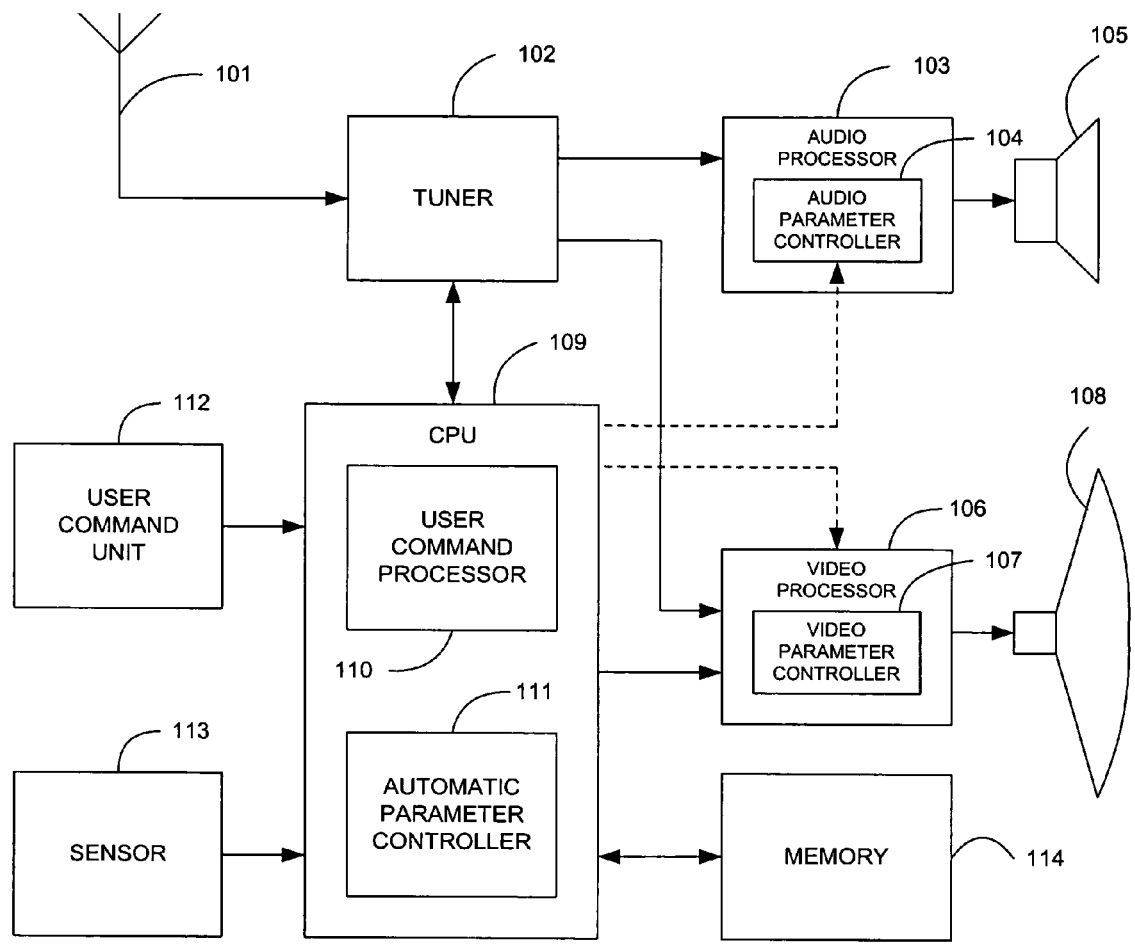
FIG. 1 shows a diagram of a television receiver as an embodiment of the apparatus according to the invention, FIG. 2 schematically shows the parameter control process of the apparatus according to the invention.

FIG. 1 shows a diagram of a television receiver as an embodiment of the apparatus according to the invention. Television signals from a plurality of channels are received from an antenna 101, or alternatively from a cable network. A tuner 102 is capable of selecting a channel in response to commands from a central processing unit 109. The signal of the selected channel is demodulated and split into an audio signal and a video signal. The audio signal is further processed by an audio processor 103 and a loudspeaker 105. The audio processor 103 comprises an audio parameter controller 104, for controlling audio parameters, such as balance, treble, bass and loudness, in response to control signals from the central processing unit 109. The video signal is further processed by a video processor 106 and displayed on a display screen 108. The video processor 106 comprises a video parameter controller 107 for controlling video parameters, such as brightness, contrast, color, sharpness, noise reduction, dynamic contrast and color enhancement, in response to control signals from the central processing unit 109. The central processing unit 109 comprises a user command processor 110 and an automatic parameter controller 111. A user command unit 112 is capable of receiving user commands, e.g. through a remote control (not shown), and sending said user commands to the central processing unit 109. For example, the user may enter a channel number in order to select the corresponding channel. The channel number is translated by the user command processor into an appropriate command which is used to control the tuner 102 to tune to the desired channel.

The central processing unit 109 further receives signals from a sensor 113, which measures the ambient light. A non-volatile memory 114 is connected to the central processing unit for storing data, e.g. presets and parameter settings. The central processing unit 109 is further capable of generating graphical pictures, such as menus, level indicators etc. The automatic parameter controller 111 is capable of controlling the audio parameter controller 104 and the video parameter controller 107 in response to signals obtained from the tuner 102, the user command processor 110 and the sensor 113, as will be explained hereinafter.

Figure 2:
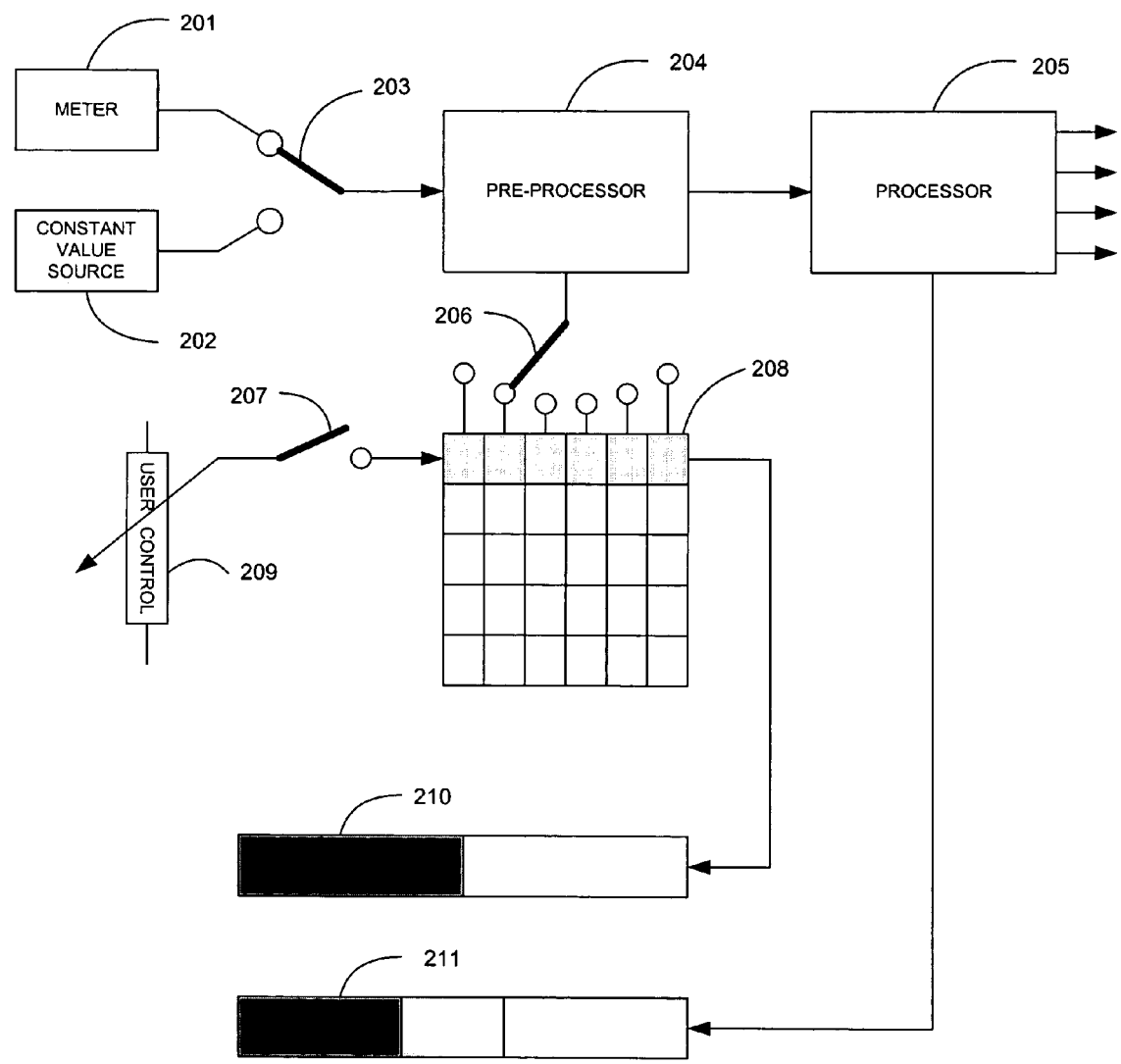

FIG. 2 schematically shows the parameter control process. It allows the user to control picture and sound parameters by choosing his own 'taste', but instead of the static settings which are known from conventional TVs, the user can benefit from the dynamics of automatic parameter adjustment and adapt it to his own wishes in an easy way. The diagram of FIG. 2 applies to every separate parameter control, e.g. noise reduction, sharpness, contrast, histogram modification etc.

A meter 201 sends meter values to a preprocessor 204. The meter values may be measurements, e.g. signal strength, motion estimation, or color. Alternatively, values may be obtained from a sensor, e.g. an ambient light sensor, or a microphone. Instead of said meter values from the meter 201 a constant value from a constant value source 202 may be selected by means of a switch 203. By means of a further switch 206 a profile may be selected from a profile table 208 and sent to the preprocessor 204 which combines it with the selected value obtained from the switch 203 and sends a resultant value to a processor 205 which determines a parameter adjustment in response to said resultant value. If the constant value is selected from the value source 202, the automatic parameter adjustment is decoupled from the meter input, and the parameter adjustments are completely determined by the profile selected from the profile table 208. Note, that the automatic parameter adjustment may be independently decoupled from the meter input for each separate parameter. The constant value generated by the value source 202 represents an 'average' value as it could be measured by the meter 201.

The processor 205 may determine the parameter adjustment by means of look-up tables and/or by means of algorithms. Each parameter may require different meter values. For example, for signals that have been affected by noise, improvement can be achieved by a combination of the pixel values of the current and past fields of video. This however is only possible for those picture areas in which no movement occurs. If movement occurs in some area, only the information from the current field of video may be displayed for that area to prevent smearing, so noise reduction is not effective there. Hence, noise reduction may be dependent on meter values representing the degree of motion in the current video content. As another example, using histogram modification techniques, the contrast of the overall picture may be improved. From a TV scene the distribution of all luminance values is taken (histogram). This histogram is used to calculate an optimal transfer curve for the particular scene, which is used to process the video digitally resulting in a picture with improved contrast. For example: when most luminance information in a scene is located below mid grey and when there is almost no white in the scene, the range of levels between halfway black and mid grey will be emphasized.

If the user wants to change a profile, the profile table 208 is connected to a user control 209 by means of a further switch 207. A value representative of the selected profile is sent to a level indicator 210, which may be a dedicated display, e.g. a LED-array or an on-screen display element which is displayed on the television screen. The level indicator 210 gives feedback on the adjustments of the selected profile.

A value representative of the parameter adjustment determined by the processor 205, based on the selected profile and the input value obtained from the switch 203, is sent to a level indicator 211, which may also be a dedicated display, e.g. a LED-array or an on-screen display element which is displayed on the television screen. The level indicators 210 and 211 may be distinct or combined, and may be visible simultaneously or only one at a time.

Normally, switch 207 is open, and switch 206 selects the desired profile, or 'smart setting'. A profile is a set of predefined coefficients representing a particular 'taste'. It may be dedicated to one particular parameter or to a combination of parameters. It is stored in the non-volatile memory 114. If the user is not satisfied with the selected user profile, its coefficients may be adjusted through the user control 209 and switch 207. The adjusted profile is stored as well in the memory 114. During this adjustment the level indicator 210 is visible, showing the adjusted value of the selected profile. The adjustment is immediately effective, adapting the picture parameters accordingly. Additional feedback is provided by the level indicator 211 which shows the combined effect of the meter input values and the selected profile, yielding a level indication which continuously follows the degree of adjustment as determined by the processor 205. The profiles of the profile table 208 may be labeled with labels such as 'off', 'minimum', 'medium', 'maximum', or e.g. 'personal', 'soft', 'natural', 'rich', 'sport', etc.

The level indicator 211 may be activated in response to a dedicated user command, e.g. a demonstration button. It may further be visible when a parameter value is adjusted by the user. The level indicator may be shown simultaneously with similar level indicators representing other signal parameters. This may be convenient in a demonstration mode to show the continuous adaptation of parameter adjustments to some or all relevant signal parameters. For example, in one screen, level indicators may be shown for e.g. brightness, contrast, dynamic contrast, color, sharpness, and noise reduction.

In summary, the invention relates to an apparatus for processing signals, comprising parameter control means for controlling parameters of said signals in response to manual adjustments by the user as well as automatically generated adjustments based on current ambient factors or properties of said signals. The apparatus according to the invention comprises indicator means for presenting a level indicator which is indicative of the combined result of the manual and automatic adjustments.

Although the invention has been described with reference to particular illustrative embodiments, variants and modifications are possible within the scope of the inventive concept. Thus, for example, described functions may be implemented in hardware or software, and combined or split up in alternative ways. The indicator means may continuously indicate the resultant adjustment, or average subsequent adjustments over a predetermined period of time. The word 'comprising' does not exclude the presence of other elements or steps than those listed.

The invention claimed is:

1. An apparatus for processing signals, comprising:
   parameter control means for controlling a parameter of said signals, said parameter control means computing adjustments to said parameter as a function of both (i) a preferred parameter level for the parameter and (ii) at least one of: a current ambient factor and a property of said signals;
   first indicator means for presenting a first level indicator which is indicative of said computed adjustments; and
   second indicator means for presenting a second level indicator which is indicative of the preferred parameter level, wherein said signals comprise video signals, wherein said parameter comprises a picture parameter, and wherein said current ambient factor comprises ambient light.

2. The apparatus as claimed in claim 1, wherein said apparatus further comprises:

user control means for setting the preferred parameter level to be input into said parameter control means, wherein said preferred parameter level is selected by a user from a plurality of parameter levels.

3. The apparatus as claimed in claim 2, wherein said picture parameter comprises one of: luminance, contrast, and brightness saturation.

4. A television receiver comprising an apparatus as claimed in claim 1.

5. The apparatus as claimed in claim 1, wherein said picture parameter comprises one of: luminance, contrast, and brightness saturation.

6. The apparatus of claim 1, wherein the first level indicator continuously follows the computed adjustments as the computed adjustments vary.

7. The apparatus of claim 1, wherein the first level indicator indicates a combined effect of the preferred parameter level and the at least one of: the current ambient factor and the property of the signals.

8. A method for processing signals, comprising the steps of:

controlling a parameter of said signals by computing adjustments to the parameter as a function of both (i) a preferred parameter level for the parameter and (ii) at least one of: a current ambient factor and a property of said signals;

presenting a first level indicator which is indicative of said computed adjustments; and presenting a second level indicator which is indicative of the preferred parameter level, wherein said method further comprises the steps of:

selecting the preferred parameter level from a plurality of parameter levels; and setting said selected preferred parameter level.

9. The method as claimed in claim 8, wherein said signals comprise video signals, wherein said parameter comprises a picture parameter, and wherein said current ambient factor comprises ambient light.

10. The method as claimed in claim 9, wherein said picture parameter comprises one of: luminance, contrast, and brightness saturation.

11. A method of operating a television receiver comprising a method as claimed in claim 8.

12. The method of operating a television receiver as claimed in claim 11, wherein said signals comprise video signals, wherein said parameter comprises a picture parameter, and wherein said current ambient factor comprises ambient light.

13. A method for processing signals, comprising the steps of:

controlling a parameter of said signals by computing adjustments to the parameter as a function of both (i) a preferred parameter level for the parameter and (ii) at least one of: a current ambient factor and a property of said signals;

presenting a first level indicator which is indicative of said computed adjustments; and presenting a second level indicator which is indicative of the preferred parameter level, wherein said signals comprise video signals, wherein said parameter comprises a picture parameter, and wherein said current ambient factor comprises ambient light.

14. The method as claimed in claim 13, wherein said wherein said picture parameter comprises one of: luminance, contrast, and brightness saturation.

15. A method of operating a television receiver comprising a method for processing signals, comprising the steps of;

controlling a parameter of said signals by computing adjustments to the parameter as a function of both (i) a preferred parameter level for the parameter and (ii) at least one of: a current ambient factor and a property of said signals;

presenting a first level indicator which is indicative of said computed adjustments; and presenting a second level indicator which is indicative of the preferred parameter level, wherein said signals comprise video signals, wherein said parameter comprises a picture parameter, and wherein said current ambient factor comprises ambient light.

16. The method of operating a television receiver as claimed in claim 15, wherein said wherein said picture parameter comprises one of: luminance, contrast, and brightness saturation.

* * * * *